Patented Jan. 22, 1935

1,988,493

UNITED STATES PATENT OFFICE 1,988,493

PRODUCTION OF NITRO-NAPHTHALENES

Herbert Henry Hodgson, Bradford, England, assignor to Imperial Chemical Industries Limited, a corporation of Great Britain No Drawing. Application November 14, 1932, Serial No. 642,683. In Great Britain November 17, 1931

3 Claims. (Cl. 260—130.5)

This invention relates to nitro-naphthalenes, more particularly alpha-nitro-naphthalenes, and a process for the production thereof. It further relates to nitro-naphthylamines and a process for their manufacture.

As is well known, naphthalene may be nitrated with suitable nitrating acids to produce nitrated products which may vary widely in chemical composition but usually consist of mixtures of nitro-naphthalenes. Thus, the product obtained by the nitration of a nitro-naphthalene, as described, for example, by Cain, Intermediate Products for Dyes, London, 1918, p. 163, consists largely of a mixture of two isomerides, viz., 1,5-dinitro-naphthalene and 1:8-dinitro-naphthalene. The proportions may vary according to the conditions of nitration, but there is usually about twice as much 1,8-dinitro-naphthalene as 1,5-dinitro-naphthalene. Since these compounds may be used for the manufacture of different chemical compounds, it is desirable to separate them and some difficulty has been experienced in doing this.

It is an object of the present invention to provide a new and improved process for separating nitro-naphthalenes from mixtures thereof. A further object is to produce nitro-naphthylamines. Another object is to provide a new and improved process for producing nitro-naphthylamines. A still further and more specific object is to provide a process for treating mixtures of dinitro-naphthalenes containing 1,8-dinitro-naphthalene and 1,5-dinitro-naphthalene whereby 1,8-dinitro-naphthalene is separated in a substantially pure state and a valuable intermediate for use in dye manufacture, namely 5-nitro-1-naphthylamine, is obtained. Other objects will appear hereinafter.

These objects are accomplished according to the present invention whereby mixtures of nitro-naphthalenes, such as, for example, mixtures consisting largely of 1:8-dinitro-naphthalene and 1,5-dinitro-naphthalene, are treated with a substance or substances having the power of preferentially reducing a nitro group in one of the nitro-naphthalenes to an amino group without acting upon the nitro groups in another nitro-naphthalene. The naphthylamine may then be separated from the unchanged nitro-naphthalene in any suitable manner, preferably by converting the amine to a salt, such as, for example, the hydrochloride, which is soluble in water or other solvent in which the unchanged nitro-naphthalene is insoluble. As reducing agents, alkali metal sulfides, alkali metal polysulfides, and alkali metal hydrosulfides or mixtures thereof, may be employed.

While the invention is susceptible of considerable variation and modification in the manner of its practical application, particularly as regards the proportions of materials, the conditions of operation, and the exact method of procedure, the following examples, in which the parts are by weight, will serve to illustrate how the invention may be practiced.

Example I

Twenty-seven and five-tenths parts of dinitro-naphthalene, as obtained by nitration of 1-nitro-naphthalene (cf. Cain loc. cit.) and drowning in ice-water of the nitration mixture, were mixed without previous drying with 200 parts of water. The resultant product was heated to 90° C., and a solution of 11.6 parts of sodium sulfide crystals and 3.1 parts of sulfur in 40 parts of water were added. The mixture was stirred for about one-fourth hour, cooled, and filtered. The residue on the filter was washed with water and treated with enough dilute hydrochloric acid to dissolve all that would dissolve. This mixture was filtered, and the residue washed with water. The solution so obtained contained the hydrochloride of 5-nitro-1-naphthylamine; the residue was relatively pure 1:8-dinitro-naphthalene. If desired, the 1,8-dinitro-naphthalene may be purified somewhat more by crystallization from a solvent such as benzene.

Example II

Twenty-seven and five-tenths parts of dinitro-naphthalene, as in Example I, were mixed with 200 parts of water at 90° C., and 17.3 parts of sodium sulfide crystals dissolved in 40 parts of water were added. The mixture was stirred at 90° C. for about one-fourth hour, cooled, and filtered. The residue was washed with water, then treated with dilute hydrochloric acid, up to 350 parts of about 2% strength, until the 5-nitro-1-naphthylamine dissolved. The residue was 1,8-dinitro-naphthalene.

Example III

The process of Example II was carried out except that instead of 17.3 parts of sodium sulfide, 4.03 parts of sodium hydrosulfide were used. The products, 1:8-dinitro-naphthalene and 5-nitro-1-naphthylamine, were recovered as previously described.

While the invention is not limited by the examples, the process has been especially useful for the production of 1,8-dinitro-napthalene and 5-nitro-1-naphthylamine.

Methods of producing mixtures of nitro-naphthalenes by nitrating naphthalene or nitro-naphthalenes are well known in the art. The reducing agents are also well known. As specific examples of reducing agents which may be employed may be mentioned sodium sulfide, potassium sulfide, sodium trisulfide, sodium pentasulfide, sodium hydrosulfide, potassium hydrosulfide, and the like.

The treatment with the reducing agent and subsequent separation of the products may be carried out in any suitable manner. It is generally desirable to effect the reduction in an inert solvent or suspension medium, such as, for example, water or ethyl alcohol. Thus, in carrying the invention into practical effect a mixture of dinitro-naphthalenes, as obtained by nitration of 1-nitro-naphthalene, is conveniently used wet (being then in a state of fine division). This wet mixture may be suspended in hot water and the reducing agent added. The mixture may then be heated and stirred, cooled and filtered. The 5-nitro-1-naphthalene may be separated from the unchanged 1,8-dinitro-naphthalene by dissolving it in dilute mineral acid, e. g., hydrochloric acid, sulfuric acid, or the like.

Notwithstanding that, besides the main products, some by-products are obtained, the chemical nature of which remains to be determined, the isomerides are separated and useful products obtained more satisfactorily by the process of the present invention than by processes hitherto described (cf. e. g. Cain loc. cit.).

The behavior of 1,8-dinitro-naphthalene toward fixed sulfides in hot aqueous suspension, for example, 90° C., normally is that a black sulfurized complex is formed but not a nitro-naphthylamine. That all formation of this black complex is avoided and a practically pure 1,8-dinitro-naphthalene obtained, while the valuable 1,5-nitro-amino body formed by preferential reduction may be separated also in a practically pure state, is a surprising and valuable feature of the invention.

As many apparently widely different embodiments of this invention may be made without departing from the spirit and scope thereof, it is to be understood that I do not limit myself to the specific embodiments thereof except as defined in the following claims.

I claim:

1. The process of producing 5-nitro-1-naphthylamine and 1,8-dinitro-naphthalene which comprises reacting a nitrated product comprising substantially 1,5-dinitro-naphthalene and 1,8-dinitro-naphthalene in water with a reducing agent selected from the group consisting of alkali metal sulfides, alkali metal hydrosulfides, and alkali metal polysulfides, in sufficient amount to reduce a nitro group of the 1,5-dinitro-napthalene to an amino group thereby forming the 5-nitro-1-naphthlylamine, adding a mineral acid adapted to convert the 5-nitro-1-naphthylamine to an amine salt soluble in water, separating the water-insoluble 1,8-dinitro-naphthalene and recovering the 5-nitro-1-naphthylamine as an amine salt from the water solution.

2. A process as claimed in claim 1 wherein sodium trisulfide is used as the reducing agent.

3. The process of producing 5-nitro-1-naphthylamine and 1,8-dinitro-naphthalene which comprises reacting a nitrated product comprising substantially 1,5-dinitro-naphthalene and 1,8-dinitro-naphthalene in water at a temperature of about 90° C. with a reducing agent selected from the group consisting of alkali metal sulfides, alkali metal hydrosulfides, and alkali metal polysulfides, in sufficient amount to reduce a nitro group of the 1,5-dinitro-napthalene to an amino group thereby forming the 5-nitro-1-naphthylamine, adding hydrochloric acid to convert the 5-nitro-1-naphthylamine to an amine hydrochloride soluble in water, separating the water-insoluble 1,8-dinitro-naphthalene and recovering the 5-nitro-1-naphthylamine as an amine hydrochloride from the water solution.

HERBERT HENRY HODGSON.